No. 766,113. PATENTED JULY 26, 1904.
J. E. NORWOOD.
SIDE BEARING FOR STREET CARS.
APPLICATION FILED APR. 14, 1902.
NO MODEL. 2 SHEETS—SHEET 1.

Witnesses
F. E. Alden.
Harry Ellis Chandler

J. E. Norwood, Inventor.
By
Attorneys

No. 766,113. PATENTED JULY 26, 1904.
J. E. NORWOOD.
SIDE BEARING FOR STREET CARS.
APPLICATION FILED APR. 14, 1902.
NO MODEL. 2 SHEETS—SHEET 2.
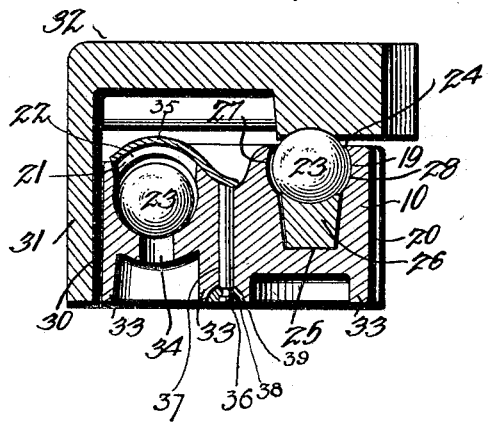
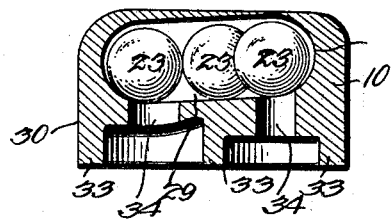
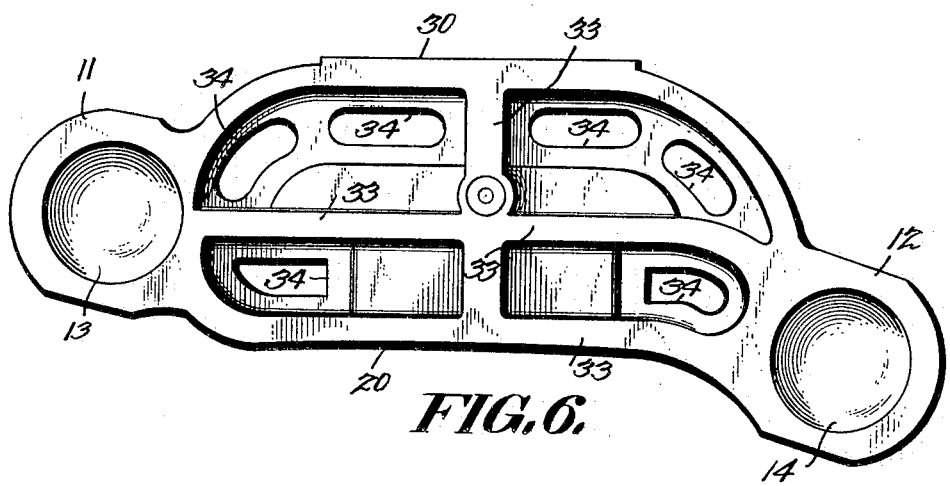
Witnesses
F. E. Alden
Harry Ellis Chandler
J. E. Norwood, Inventor.
By Chandler & Chandler
Attorneys No. 766,113.

Patented July 26, 1904.

UNITED STATES PATENT OFFICE.

JOHN E. NORWOOD, OF BALTIMORE, MARYLAND, ASSIGNOR TO BALTIMORE BALL BEARING CO., OF BALTIMORE, MARYLAND, A CORPORATION OF MARYLAND.

SIDE BEARING FOR STREET-CARS.

SPECIFICATION forming part of Letters Patent No. 766,113, dated July 26, 1904.

Application filed April 14, 1902. Serial No. 102,867. (No model.)

*To all whom it may concern:*

Be it known that I, JOHN E. NORWOOD, a citizen of the United States, residing at Baltimore, in the State of Maryland, have invented certain new and useful Improvements in Side Bearings for Street-Cars; and I do hereby declare the following to be a full, clear, and exact description of the invention, such as will enable others skilled in the art to which it appertains to make and use the same.

This invention relates to side bearings for cars, and particularly for street-cars, the structure shown being designed for use in connection with what is known as the "Brill" truck, although it will of course be understood that the principles involved may be employed in a bearing for use in connection with any other form of truck and in connection with cars other than street-cars.

The object of the invention is to provide a bearing of the roller type wherein a number of the balls will be active while the remaining balls are inactive, the balls passing successively into action and successively out of action as the truck swings in either direction, the path of the balls being such that their directions of rotation are changed in passage from action to inaction, and vice versa, so that the balls are made to wear evenly and do not become lopsided.

A further object of the invention is to so form the casing for the balls as to effect economy in metal and at the same time to present the required outside wear-face to receive pressure of the flanges of the wear-plates on the body-bolster to prevent excessive lateral movement of the body with respect to the truck.

Other objects and advantages of the invention will be understood from the following description and include the provision of a casing, which may be formed integral and which will permit of introduction and removal of the balls and wear-plate.

Figure 1:
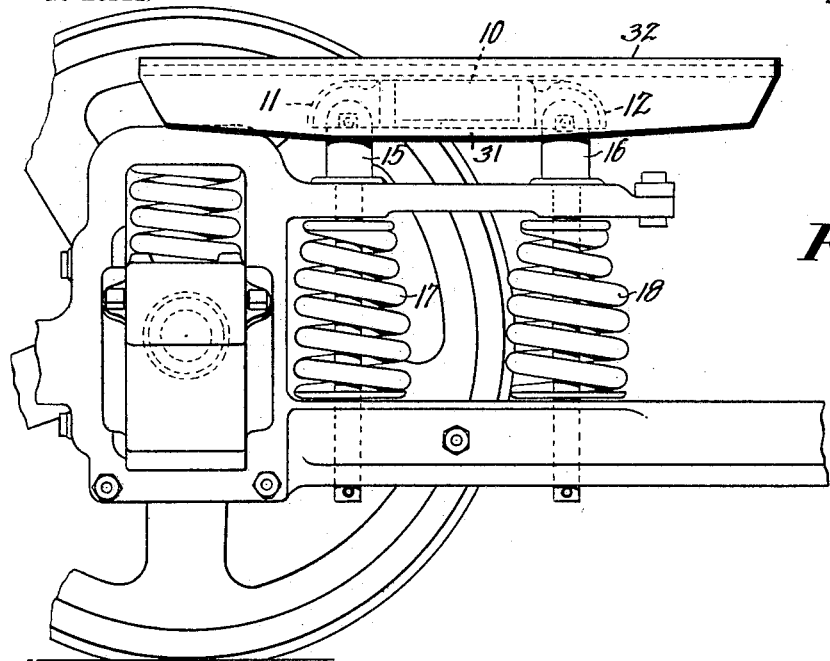
Figure 3:
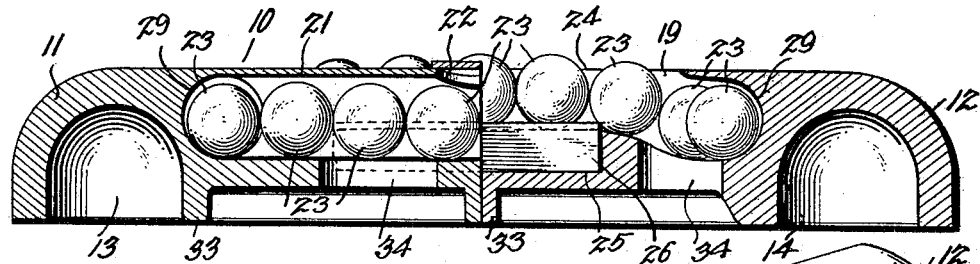
Figure 2:
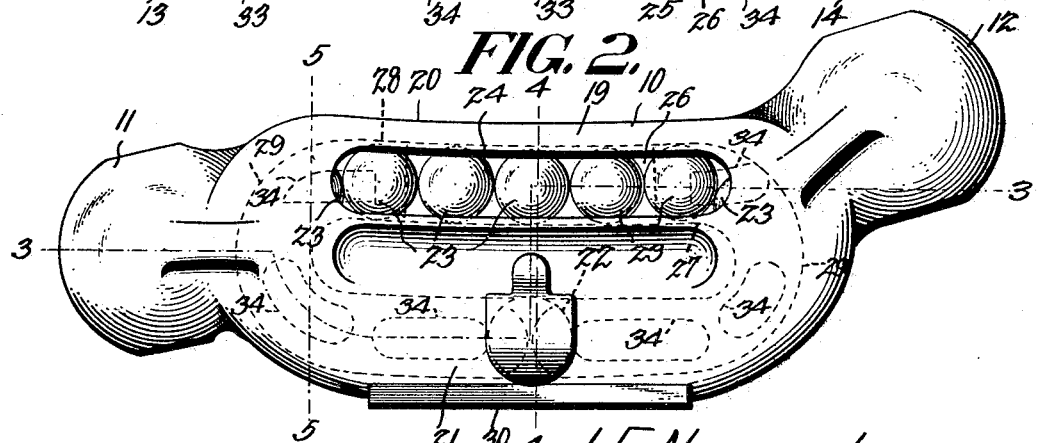

In the drawings forming a portion of this specification, and in which like numerals of reference indicate similar parts in the several views, Figure 1 is a side elevation showing a portion of a Brill truck and indicating the location and arrangement of the present bearing. Fig. 2 is a top plan view of the bearing. Fig. 3 is a section on line 3 3 of Fig. 2. Fig. 4 is a section on line 4 4 of Fig. 2. Fig. 5 is a section on line 5 5 of Fig. 2. Fig. 6 is a bottom plan view of the bearing-casing.

Referring now to the drawings, the present bearing comprises the casing, including a substantially arc-shaped central body portion 10, having the projecting end bosses 11 and 12, which lie in a line at an acute angle to the radius of curvature of the body portion, these bosses having sockets 13 and 14 in their under sides which receive the rounded upper ends of the supporting-rods 15 and 16 of the truck, (shown in Fig. 1,) whereby rocking engagement of the casing with the posts is secured, and which rods have the usual sustaining-springs 17 and 18, said truck having a structure well known in the art and requiring no specific description.

Within the casing is formed a ball-passage, including an arc-shaped portion 19, formed parallel with the inner concaved face 20 of the casing. The ball-casing includes also an outer arc-shaped portion 21, parallel to the portion 19, but in a lower plane than the portion 19, the portion 21 being covered excepting for an annular opening 22 in the upper wall thereof midway of its ends, which permits of the introduction of the bearing-balls 23. The upper wall or roof of the portion 19 of the ball-passage is slotted longitudinally, as shown at 24, and in the bottom of the portion 19 is a seat 25, in which is disposed the arc-shaped race-plate 26 of such a height to support the balls 23 with their upper portions protruding through the opening 24 and above the upper surface of the casing. The side walls 27 and 28 of the portion 19 of the ball-passage are concaved, and the slot 24 is of less width than the diameters of the balls, so that the balls are prevented from removal through the slot.

As shown in Fig. 5 of the drawings and indicated in Fig. 4, the ends of the portions 19 and 21 of the ball-passage are connected by the inclined arc-shaped portions 29, the inclines extending to the ends of the race-plate, so that when a ball moves from the race-plate it immediately passes out of the plane of action, which is the plane to which the balls upon the race-plate are all tangent.

It will be noted that it is the outer portion 21 of the ball-passage that is occupied by the balls when they are inactive and the inner portion when they are active, the portions 29 of the passage being curved reversely with respect to the active portion 19. By thus reversing the curvature of the ball-passage the balls never enter upon the race-plate with their same portions uppermost as when they leave the race-plate, so that the active faces of the balls are continually changing, and as a result the balls are worn evenly. Furthermore, by carrying the balls outwardly from their active positions the casing is enlarged outwardly and provides for the formation of the wear-face 30 at the outer side of the casing, and which wear-face coöperates with the flange 31 on the upper wear-plate 32, carried by the body-bolster, to prevent lateral motion of the body upon the truck.

In practice the bearing-casing is cast integral, and on the under face are the flanges 33, which serve to strengthen the structure, and opening through the bottom walls of the portions 29 and 21 of the ball-passage are the openings 34, which permit foreign matter that may enter the ball-passage to drop therefrom. To prevent loss of balls in shipment, a cover 35 is provided for the opening 22 and has a laterally-extending portion provided with a stem 36, which is passed downwardly through the perforation 37 in the bearing-casing and has at its free end a circumferential groove 38, which grooved portion lies in the countersunken lower end of the perforation 37. To hold the stem in place, and therewith the cover, a seal 39 is cast into the countersink and into the peripheral groove of the stem.

When the bearing-casing is to be set upon a flat bolster, the opening for the passage of the dirt may be formed through the sides of the casing, as will be understood, and ears may be cast upon the casing to receive bolts for holding it to a bolster.

What is claimed is—

1. In a bearing for cars, an integral casing having a continuous passage therein in which are disposed balls, a portion of the passage having a slot through which the balls project, a removable race-plate in the bottom of the slotted portion of the passage and on which said balls are supported in action, said slot being of a width less than the diameters of the balls, the slotted portion of the ball-passage being in a higher plane than the remaining portion, and the lower portion of the slot having dirt-outlet openings in its bottom and an inlet for the balls in its top.

2. A bearing for cars comprising a casing having a continuous ball-passage therein and balls in the passage, said passage including an arc-shaped portion having a slot through which the balls project for contact with the bearing-plate, said passage extending from the slotted portion exteriorly of the curvature thereof, the side of the casing beyond the last-named portion of the passage having an arc-shaped bearing-face for the purpose set forth.

3. In a ball-bearing for cars, an integral casing having a continuous ball-passage in which are disposed balls, a portion of the passage having a slot through which the balls project, the slotted portion of the ball-passage lying in a different plane from the remaining portion of the passage, a part of the said remaining portion of the passage having dirt-outlet openings in its under side, and a flange upon the bottom of the casing depending below the lower ends of the dirt-outlet openings to hold said lower ends of the openings above a support upon which the casing may be disposed.

4. In a side bearing for cars, the combination with a casing formed with an endless way having portions lying in different planes and connecting inclined portions, the portion of greatest elevation having a race-plate, of balls disposed in the way, said way at the ends of the race-plate having openings through its bottom for discharge of foreign matter and to intercept such matter in its passage to the race-plate, and means for holding the casing with the lower ends of the dirt-outlet openings elevated.

5. In a bearing for cars a casing formed integral and having a continuous ball-passage therein in which is disposed a continuous series of balls, a portion of the passage having a slot through which the balls project and in which they are confined, said slot being of lesser width than the diameters of the balls to prevent displacement of the balls, the remaining portion of the ball-passage being covered and having an opening in its roof to permit of insertion of the balls, the slotted portion of the ball-passage being curved reversely to the remaining portion of the ball-passage.

In testimony whereof I affix my signature in presence of two witnesses.

JOHN E. NORWOOD.

Witnesses:
BRUCE B. GOOTEE,
WM. D. ALLEN.